United States Patent [19]
Wunning et al.

[11] 3,926,038
[45] Dec. 16, 1975

[54] METHOD AND APPARATUS FOR TESTING OF A LQIUID TO DETERMINE A MINOR ADMIXTURE OF A LOWER BOILING POINT MATERIAL

[75] Inventors: Joachim Wunning, Warmbronn; Rolf Bieber, Ditzingen; Heinz Lustig, Friolzheim, all of Germany

[73] Assignee: Firma J. Aichelin, Stuttgart, Germany

[22] Filed: May 8, 1974

[21] Appl. No.: 467,912

[30] Foreign Application Priority Data
July 5, 1973    Germany............................ 2334255

[52] U.S. Cl............................... 73/61.1 R; 73/61.3
[51] Int. Cl.²......................................... G01N 25/00
[58] Field of Search............... 73/61.1 R, 61.3, 15 R

[56] References Cited
UNITED STATES PATENTS

| | | | |
|---|---|---|---|
| 2,571,470 | 10/1951 | Milligan | 73/61.1 R |
| 3,511,083 | 5/1970 | Reay et al. | 73/61.1 R |
| 3,695,095 | 10/1972 | Lineberg | 73/61.1 R |
| 3,796,089 | 3/1974 | Schuster et al. | 73/61.1 R |

*Primary Examiner*—Richard C. Queisser
*Assistant Examiner*—Joseph W. Roskos
*Attorney, Agent, or Firm*—Flynn & Frishauf

[57] ABSTRACT

A method for continuous testing of a liquid to determine the presence of small amounts of a lower boiling point material therein. The liquid is heated to at least the boiling point of the lower boiling material. The velocity of a stream of said liquid without the lower boiling point material is determined. If the lower boiling point material is present in the liquid, the velocity of the stream increases greatly and is a measure of the amount of the lower boiling point material. Apparatus is provided for carrying out the method.

17 Claims, 1 Drawing Figure

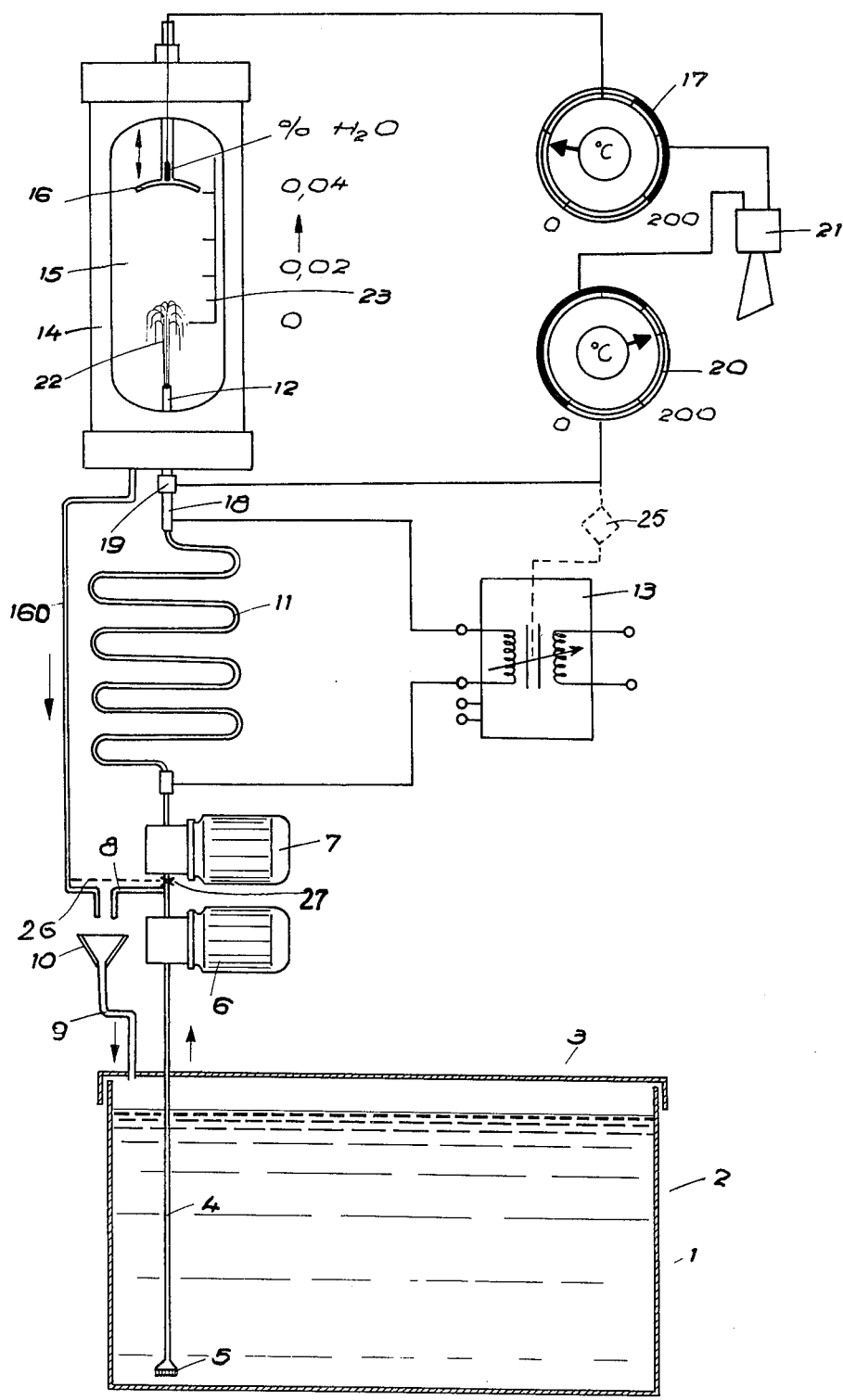

METHOD AND APPARATUS FOR TESTING OF A LQIUID TO DETERMINE A MINOR ADMIXTURE OF A LOWER BOILING POINT MATERIAL

The present invention provides a method and apparatus for continuous testing and monitoring of a liquid to determine whether the liquid contains a slight admixture of a material, usually a contaminant, having a lower boiling point. The method and apparatus are particularly useful in detecting the presence of small amounts of water in oil.

The properties and characteristics of oil change when water is admixed therewith in amounts of even less than 0.1%. When the oil is used as a cooling liquid, for example, as a quenching medium or even a spray cooling medium in the heat treatment and particularly the hardening of metals, and even as a cooling medium in heat exchanges generally, the contamination of the oil with a small amount of water is disadvantageous. It may result in foam formation with resultant local overheating. The heat transfer function is impaired because of the formation of a vapor skin on the surface of the metal being cooled. If the oil is in a closed system, a considerable pressure increase may result. Oil being used for other purposes suffers similar disadvantages. The electrical characteristics and lubricating characteristics of oils are also affected by the presence of small amounts of water.

It is therefore often necessary to test and even continuously monitor commercial oils to determine whether there is any water present, even in trace amounts. There is similar need for testing other liquids whose properties are impaired when the liquid is contaminated with minor amounts of another liquid or other material.

Oil has been tested to determine traces of water by heating and listening for a crackling sound before the delayed boiling. This so-called "crackling test" is not susceptible to automation. It is also known to distill an oil sample to determine whether it contains any water and thereby separate the water. This requires a relatively complicated apparatus which generally is only available in a laboratory. DT-OS 1,598,712 discloses a method whereby the presence of water in oil may be determined by measuring the increase in pressure which results when the contaminated sample is heated to about 150°C. This method also is not carried out continuously and also requires relatively complicated apparatus. Other possible tests involve changes in the electrical characteristics, such as electrical conductivity and the dielectric constant. However, the values of these characteristics and measurements are influenced by the type of oil as well as other impurities in the oil. The process and apparatus of the present invention provides a reliable method and apparatus to continuously test a liquid for the presence of even slight amounts of contaminants having a lower boiling point than the liquid and particularly to test oil for the presence of small amounts of water. The method and apparatus is useful under severe service conditions, such as those present in a heat treating shop which generally involves accumulation of dirt in the oil, considerable heating of the oil, and little supervisory attendance of the equipment.

SUBJECT MATTER OF THE INVENTION

The present invention provides a method for determining the presence of a lower boiling constituent in a higher boiling liquid. The liquid is continuously and quickly heated to a temperature at least as high as the boiling temperature of the low boiling constituent. The heated liquid is then passed through a means for measuring the velocity of a stream. The velocity of the stream is compared with the standard (calibrated) velocity determined for a stream of the uncontaminated liquid under the same conditions. If the velocity is substantially faster, the liquid contains a low boiling impurity. The increase of velocity results from the vaporization of the low boiling impurity within the liquid. The process is carried out under conditions such that the vaporized (gaseous) low boiling constituent does not separate from the liquid.

The measurement of the velocity of the liquid may advantageously be carried out by measuring the velocity of the heated liquid being tested at its exits from a nozzle. If the nozzel projects vertically upward, the velocity is proportional to the height attained by the liquid stream exiting from the nozzle. Since the liquid exiting from the nozzle is hot, a temperature sensor may be located at a distance from the nozzle such that it is only activated when the velocity of the liquid exiting from the nozzle has reached a predetermined value. This by calibration is determined to be the value corresponding to an undesirably high level of the impurity being tested for in the oil.

From experience, it has been determined that if the continuous stream of liquid being tested is continuously heated to the final temperature within a period not exceeding ten seconds, the vaporized impurity and the liquid do not separate into separate phases but are intermingled.

The method of the present invention is advantageously carried out in apparatus which provides means for continuously bringing a constant stream of the liquid being tested to a heating device in which the test liquid is continuously heated to a temperature which corresponds to at least the boiling temperature of the low boiling material. The apparatus preferably utilizes a resistance heated coil to heat the liquid. The liquid is then exited through a nozzle into a measuring chamber. The measuring chamber contains at least one sensor to determine the changes in the velocity of the stream exiting from the nozzle. The sensor may be interconnected to a signling device which provides a signal when there has been a predetermined change in velocity of the liquid stream. The measuring chamber also has a return line for the liquid which exits from the nozzle.

The invention will be described by way of examples hereinafter and with special reference to the accompanying drawing which is a schematic drawing of the apparatus.

In oil container 1, there is contained an oil supply 2 which is to be monitored to determine whether it contains an undesirably high content of water. Cover 3 protects the oil against the introduction of coarse (large) impurities. Oil is withdrawn from the oil supply through a coarse filter 5 attached at the end of duct 4. Auxiliary pump 6 provides the pressure necessary for withdrawal in conjunction with a calibrated oil pump 7 connected sequentially with duct 4. A return duct 8 positioned between auxiliary pump 6 and calibrated pump 7 returns excess oil which is brought up by auxiliary pump 6 to a return funnel 10 which returns the oil to container 1 through line 9.

The high pressure (output) side of the calibrated oil pump 7 passes the oil to a heating coil 11 which in turn passes the heated oil to a vertically positioned nozzle 12. The heating coil 11 comprises an electrically conductive material such as copper. It is connected to the secondary winding of a low voltage transformer 13 so that the current is conducted through the wall of the heating coil which causes a resistance heating of the coil 11.

The vertical nozzle 12 is positioned in the lower portion of a closed measuring chamber 14 which has a control window 15. The oil which flows into the measuring chamber through the nozzle is returned to funnel 10 through return line 160. In the measuring chamber 14 a temperature sensor 16 is positioned opposite nozzle 12. The distance between temperature sensor 16 and nozzle 12 is adjustable and this distance is calibrated so that when the temperature sensor is actuated, a predetermined level of water impurity in the oil has been reached. The temperature sensor 16 is connected to an indicator device 17 and passes measuring signals to said device 17 dependent on the temperature of the temperature sensor 16.

The apparatus also includes a temperature sensor 19 which is positioned in the output end of the heating coil 11 which connects with the nozzle 12. The temperature sensor 19 is connected to a control indicator device 20 which together with the indicator device 17 are connected with an alarm in the form of a horn 21 which is triggered when a specified limiting temperature of the temperature sensor 16 is exceeded.

In operation, the apparatus works by auxiliary pump 6 and the calibrated oil pump 7 withdrawing a constant oil stream at a temperature under 100°C through the duct 4 from the oil container 1. The purpose of the auxiliary pump 6 is to shorten the idle time when the apparatus is switched on to only a few seconds. It also functions to make the calibrated oil pump 7 function independently of the suction height and the length of the duct 4.

The oil stream exiting from the calibrated oil pump 7 flows through the heating coil 11 in which it is heated to a temperature of 100°C or higher. Heating has to be carried out rapidly so that the oil and the minor amounts of water contained therein do not separate when the water vaporizes as a result of the heating to above the boiling point of water. In practice it has been determined that the said vaporization procedure may be permitted to take place during the maximum time interval of about 10 seconds.

The boil heated in the heating coil 11 is then passed through the nozzle 12 which is positioned in the measuring chamber 14 in the form of a vertical free jet (stream) 22. The height of the stream depends upon the amount of water admixed in the oil. The height of the stream 22 can be visually determined directly and quantitatively read off through the control window 15 by reading the engraved scale 23. This permits an immediate good estimate of the amount of water in the oil.

If the amount of water in the oil and the consequent increased velocity of the heated oil and the consequent increased height of the stream 22 reaches a critical specified value, the stream 22 contacts the temperature sensor 16 which has been positioned a specified distance from the nozzle 12. This causes the temperature of the temperature sensor to rise very rapidly. This then sends a signal which corresponds to the aforesaid rise in temperature to the indicator device 17 and simultaneously effects the sounding of horn 21.

The control indicator device 20 serves to measure the oil temperature when entering the nozzle 12 and thus serves to control the heating coil 11.

The oil which exits through the nozzle 12 and forms the stream 22 falls back in the measuring chamber 14 and is collected at the bottom thereof. It flows through the return line 160 to the return funnel 10 and back into the oil container 1. The test procedure has a cleansing effect on the oil tested because the water in the oil jet was heated to over 100°C and separates from the oil in the measuring chamber 14 so that the returned oil is water free.

The method of the present invention and the use of the described apparatus is based on the knowledged that when a low boiling contaminant in a liquid stream containing such contaminant is vaporized, there is a considerable increase in the volume of the liquid stream and a consequent increase in the velocity of the stream. This increase in volume may be determined by measuring the change of velocity of the stream. This is accomplished in a simple manner by measuring the length (height) of a free stream of the liquid exited through a nozzle in a closed chamber.

The specific volume in $dm^3/kg$ for water, oil, and oil contaminated with water, at 50°C and 150°C follow:

| Temp. | Water | Oil (pure) | Oil contaminated with water | |
|---|---|---|---|---|
| | | | 0.02% $H_2O$ | 0.05% $H_2O$ |
| 50°C | 1.0 (vapor) | 1.3 | 1.3 | 1.3 |
| 150°C | 2,000 | 1.4 | 1.8 | 2.4 |

From the foregoing tabulated information, it is determined that the presence of water in oil in amounts of 0.01% by weight when heated increases the volume of the oil stream exiting from nozzle 12 when compared to the volume of pure oil by 29%. When the oil contains an admixture of 0.05% of water, the volume of the heated oil stream increases about 71%. Since the height of the stream of oil or width thereof increase with the square of the velocity through the nozzle (exit velocity), there is a rapid increase in the height of the stream or in the width of the stream of 65 or 190%, respectively, when the oil contains an admixture of 0.02 or 0.05% (by weight) respectively. The said 65 and 190% increase is compared to the height or width of the heated stream of oil which does not contain the water.

Tests have determined that when using a simple pump for the calibrated oil pump 7 whose constancy of output varies within 10%, and without any special precautions to increase the constancy of the calibrated pump output or for removal of pulsations, water in the amounts of 0.02 weight % are reliably determined by the temperature sensor 16.

An example of the perameters and specific conditions for operation of the apparatus of the present invention follow.

| | |
|---|---|
| oil temperature: | 20° to 95°C |
| auxiliary pump: | 50 $dm^3/h$ |
| measuring pump: | 12 $dm^3/h$ |
| flow time through (heating coil): | 6 seconds |

-continued

| | |
|---|---|
| heated to: | 160°C |
| nozzle diameter: | 2.2 mm |
| exit velocity (pure oil): | 0.88 m/s |
| jet height (pure oil): | 40 mm ($=v^2/2\ g$) |
| jet height at 0.02 weight % water: | 65 mm |
| jet height at 0.05 weight % water: | 115 mm |

It has been determined that when the temperature is designed so that the exit velocity of the heated pure oil (i.e., containing no admixture of water or other low boiling liquid impurity) exiting through nozzle 12 is between 0.2 and 2 m/s.

For reproduction in operation it is desirable to adjust the temperature of the oil entering nozzle 12 automatically to a specified value. This may be accomplished by utilizing the signal to the control indicator 20 from the temperature sensor 19 so that it is also fed to a corresponding regulator indicated in broken lines 25 which acts to control the amount of heat supplied to the heating coil 11. This may be accomplished for example by utilizing a rotary transformer with variable output as the low frequency transformer 13.

The apparatus also provides a simple calibration for the position of the temperature sensor 16. The oil flowing back from the measuring chamber 14 through the return line 160 is fed directly to the calibrated oil pump 7 as indicated in broken line 26. This is accomplished by closing off duct 4 and opening line 26 to the calibrated pump 7 by the action of a three-way valve 27. The oil flowing back through return line 160 is water free as noted hereinbefore because it had been heated to a temperature of over 100°C and the water vapor had separated in the measuring chamber 14. Thus the height of the stream 22 obtained when processing the returned oil from line 26 calibrated the apparatus to a zero water value. While this calibration is carried out, the conveyor line 4 is closed by the valve 27 so that no oil which is contaminated by water is pumped through pump 7 to interfer with the calibration.

The apparatus of the present invention has the advantage that it is simply constructed without complicated components resulting in a low cost of manufacture. Only relatively little attendance is required. The apparatus functions effectively under difficult service conditions for example in a heat treating shop. It is absolutely reliable. It has the further advantage in that it does not require calibrating with outside standards.

The method of the present invention has the advantages that it provides a simple and reliable method for monitoring a supply of oil to determine the presence of small amounts of water or of other low boiling point contaminants. The accuracy of the method is relatively high. Thus when testing oil it is possible without difficulty to determine water in amounts of 0.01%.

The process, particularly when used to test oil, is independent of the type of oil being tested or its viscosity or the amount of dirt accumulated therein. It provides continuous monitoring and has little down time. As noted it is useful for measuring and determining trace amounts of impurities in liquids so long as the impurities being tested for have a boiling point markedly lower than that of the host liquid.

We claim:

1. A method for determining the amount of a minor liquid component in a liquid comprising a major component and said minor component, said minor component having a lower boiling point than said major component, comprising passing a predetermined volume of said liquid being tested through a heating device whereby said liquid being tested is heated during a predetermined period of time to a predetermined temperature which is above the boiling point of said minor liquid component and below the boiling point of said major liquid component whereby any minor liquid component contained in said liquid being tested is vaporized, said predetermined period of time being insufficient for separation of said vaporized minor component from said major component, and then passing said heated liquid through a nozzle defining a constricted opening to produce an unsupported liquid jet, measuring a dimension of said unsupported liquid jet, and then comparing said measured dimension with a predetermined dimensional value corresponding to an unsupported liquid jet for the same predetermined volume of a liquid consisting of said major component passed through said constricted opening after having been heated under the same conditions.

2. The method of claim 1 wherein said dimensional value corresponding to the same predetermined volume of a pure liquid was obtained by passing said pure liquid through said heating device for said predetermined period of time to bring said pure liquid to said predetermined temperature and then passing said heated pure liquid through said constricted opening and measuring the said dimensional value thereof.

3. The process of claim 2 wherein said velocity of the liquid stream of said pure liquid is between 0.2 and 2 m/s.

4. The method of claim 1 wherein oil is said major component and wherein water is said minor component and wherein said predetermined period of time is a period of up to ten seconds.

5. The method of claim 4 wherein said constricted opening is a nozzle positioned such that the said liquid stream exits from said nozzle in substantially an upward vertical direction to form said unsupported liquid jet, and wherein the height of said jet is measured.

6. The method of claim 5 wherein the height of said jet is determined by a temperature sensor positioned at a predetermined distance from said nozzle.

7. The method of claim 6 carried out in a continuous manner.

8. The method of claim 1 wherein said dimension being measured comprises the length of said unsupported liquid jet.

9. Apparatus for determining the amount of a minor liquid component in a liquid comprising a major component and said minor component, said minor component having a lower boiling point than said major component, comprising:
   heating means;
   pumping means coupled to said heating means for pumping a predetermined volume of said liquid being tested through said heating means wherein said liquid being tested is heated during a predetermined period of time to a predetermined temperature which is above the boiling point of said minor liquid component and below the boiling point of said major liquid component, whereby any minor liquid component contained in said liquid being tested is vaporized, said predetermined period of time being insufficient for separation of said vaporized minor component from said major component;

nozzle means defining a constricted opening coupled to an outlet of said heating means and oriented to produce an unsupported liquid jet at the outlet thereof; and means for measuring a dimension of said unsupported liquid jet and for comparing said measured dimension with a predetermined dimensional value corresponding to a liquid jet produced for the same predetermined volume of a liquid consisting of said major component passed through said nozzle means after having been heated in said heating means under the same conditions.

10. Apparatus according to claim 9 wherein said measuring means comprises means for measuring the height of said unsupported liquid jet, said height being a function of the amount of said minor liquid component in said liquid being tested.

11. Apparatus according to claim 9 wherein said measuring means comprises a measuring chamber, said nozzle means being positioned in the lower portion of said measuring chamber and oriented such that said unsupported liquid jet is directed in substantially an upward vertical direction, said measuring means further comprising means for measuring the height of said unsupported liquid jet, said height being a function of the amount of said minor liquid component in said liquid being tested.

12. The apparatus of claim 11 wherein said heat measuring means comprises a temperature sensor which is connected to a recording device of a signalling device.

13. The apparatus of claim 12 wherein said measuring means includes means for varying the distance of said temperature sensor from said nozzle.

14. The apparatus of claim 9 wherein said heating means comprises a heating coil heated by resistance heating.

15. The apparatus of claim 9 wherein said pumping means comprises an auxiliary pump and a controlled constant volume pump connected sequentially to said heating means and containing an overflow pipe between said pumps.

16. The apparatus of claim 15 containing a return line from said measuring means which is connected to said constant volume pump through an interruptable valve means.

17. The apparatus of claim 9 wherein said heating means is connected to a temperature regulator whereby the heat input of said heating means may be controlled thereby controlling the temperature of the liquid to be heated by said heating means.

* * * * *